(12) United States Patent
    Harmat

(10) Patent No.: US 10,399,118 B2
(45) Date of Patent: Sep. 3, 2019

(54) APPARATUS FOR TREATING A WELLBORE SCREEN AND METHOD

(71) Applicant: ABSOLUTE COMPLETION TECHNOLOGIES LTD., Calgary (CA)

(72) Inventor: Fred Harmat, Edmonton (CA)

(73) Assignee: SCHLUMBERGER CANADA LIMITED, Calgary (CA)

( * ) Notice: Subject to any disclaimer, the term of this patent is extended or adjusted under 35 U.S.C. 154(b) by 127 days.

(21) Appl. No.: 15/451,095

(22) Filed: Mar. 6, 2017

(65) Prior Publication Data

US 2017/0173631 A1  Jun. 22, 2017

Related U.S. Application Data

(62) Division of application No. 14/378,308, filed as application No. PCT/CA2013/050108 on Feb. 12, 2013, now Pat. No. 9,616,449.
(Continued)

(51) Int. Cl.

| | |
|---|---|
| *B05C 7/00* | (2006.01) |
| *E21B 43/08* | (2006.01) |
| *B05D 7/22* | (2006.01) |
| *B05C 7/08* | (2006.01) |
| *B05C 7/04* | (2006.01) |
| *B05C 7/02* | (2006.01) |
| *B01D 37/02* | (2006.01) |
| *B05B 13/06* | (2006.01) |

(52) U.S. Cl.
CPC ............... *B05D 7/22* (2013.01); *B01D 37/02* (2013.01); *B05B 13/0645* (2013.01); *B05B 13/0663* (2013.01); *B05B 13/0681* (2013.01); *B05C 7/00* (2013.01); *B05C 7/02* (2013.01); *B05C 7/04* (2013.01); *B05C 7/08* (2013.01); *E21B 43/08* (2013.01); *B05B 13/0636* (2013.01); *E21B 43/082* (2013.01); *E21B 43/084* (2013.01)

(58) Field of Classification Search
CPC .................... B05D 7/22; E21B 43/08–088
See application file for complete search history.

(56) References Cited

U.S. PATENT DOCUMENTS

| 2,470,796 A | 5/1949 | Stromquist |
| 2,734,832 A | 2/1956 | Lewis |

(Continued)

FOREIGN PATENT DOCUMENTS

| DE | 2816591 | 10/1979 |
| GB | 843578 | 8/1960 |

(Continued)

*Primary Examiner* — Alex A Rolland
(74) *Attorney, Agent, or Firm* — Bennett Jones LLP

(57) ABSTRACT

An apparatus and methods for applying an inner coating to a wellbore screen are described. The apparatus comprises a support for the wellbore screen, an elongate injector for injecting coating material into the inner bore of the wellbore screen, and a driver for positioning the elongate injector into the inner bore and moving the elongate injector through the inner bore to introduce coating material to the inner bore. The elongate injector has a supported end, a distal end, and a coating material delivery line extending through the elongate injector from a coating material supply to a port at the distal end.

13 Claims, 6 Drawing Sheets

Related U.S. Application Data

(60) Provisional application No. 61/598,145, filed on Feb. 13, 2012.

(56) References Cited

U.S. PATENT DOCUMENTS

| | | | |
|---|---|---|---|
| 2,941,500 A | 6/1960 | Adams | |
| 3,027,095 A | 3/1962 | Paasche | |
| 3,109,262 A | 11/1963 | Weaver et al. | |
| 3,180,312 A | 4/1965 | Handley et al. | |
| 3,257,698 A * | 6/1966 | Ruegsegger | B28B 19/0023 15/104.18 |
| 3,858,552 A * | 1/1975 | Takata | B05B 13/0636 118/318 |
| 4,216,249 A | 8/1980 | Clayton | |
| 4,256,445 A | 3/1981 | Pingree | |
| 6,106,749 A | 8/2000 | Adly | |
| 6,632,475 B1 * | 10/2003 | Bleggi | B05B 3/027 118/302 |
| 6,761,218 B2 | 7/2004 | Nguyen et al. | |
| 6,916,502 B2 | 7/2005 | Moore et al. | |
| 7,258,166 B2 | 8/2007 | Russell | |
| 7,360,593 B2 | 4/2008 | Constien | |
| 7,461,699 B2 | 12/2008 | Richard et al. | |
| 7,581,586 B2 | 9/2009 | Russell | |
| 7,861,787 B2 | 1/2011 | Russell | |
| 8,061,296 B1 | 11/2011 | Batur | |
| 2005/0065037 A1 * | 3/2005 | Constien | C09K 8/52 507/203 |
| 2011/0076397 A1 | 3/2011 | Rauch | |
| 2011/0192605 A1 | 8/2011 | Wann | |
| 2012/0000651 A1 | 1/2012 | Panga et al. | |
| 2012/0000653 A1 | 1/2012 | Panga et al. | |
| 2012/0024526 A1 | 2/2012 | Liang et al. | |
| 2013/0075090 A1 | 3/2013 | Woiceshyn | |
| 2013/0112400 A1 | 5/2013 | Woiceshyn et al. | |

FOREIGN PATENT DOCUMENTS

| | | |
|---|---|---|
| JP | 2009297630 | 12/2009 |
| JP | 2009297660 | 12/2009 |
| WO | 9717524 | 5/1997 |
| WO | 2005056977 | 6/2005 |

* cited by examiner

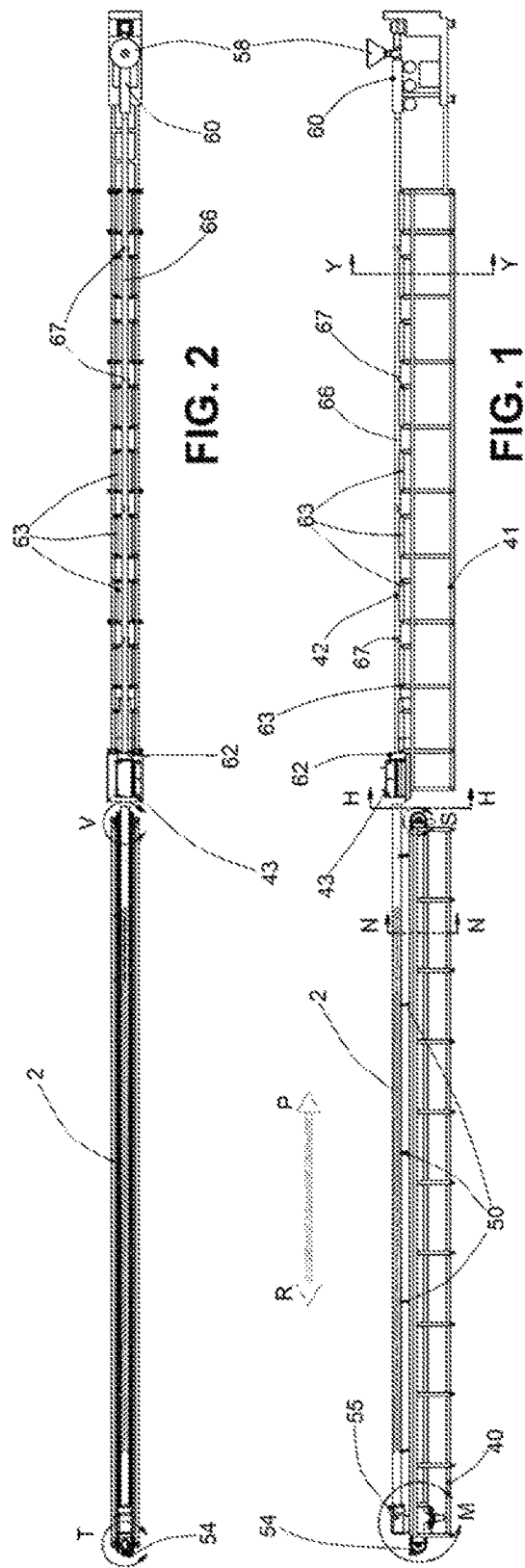

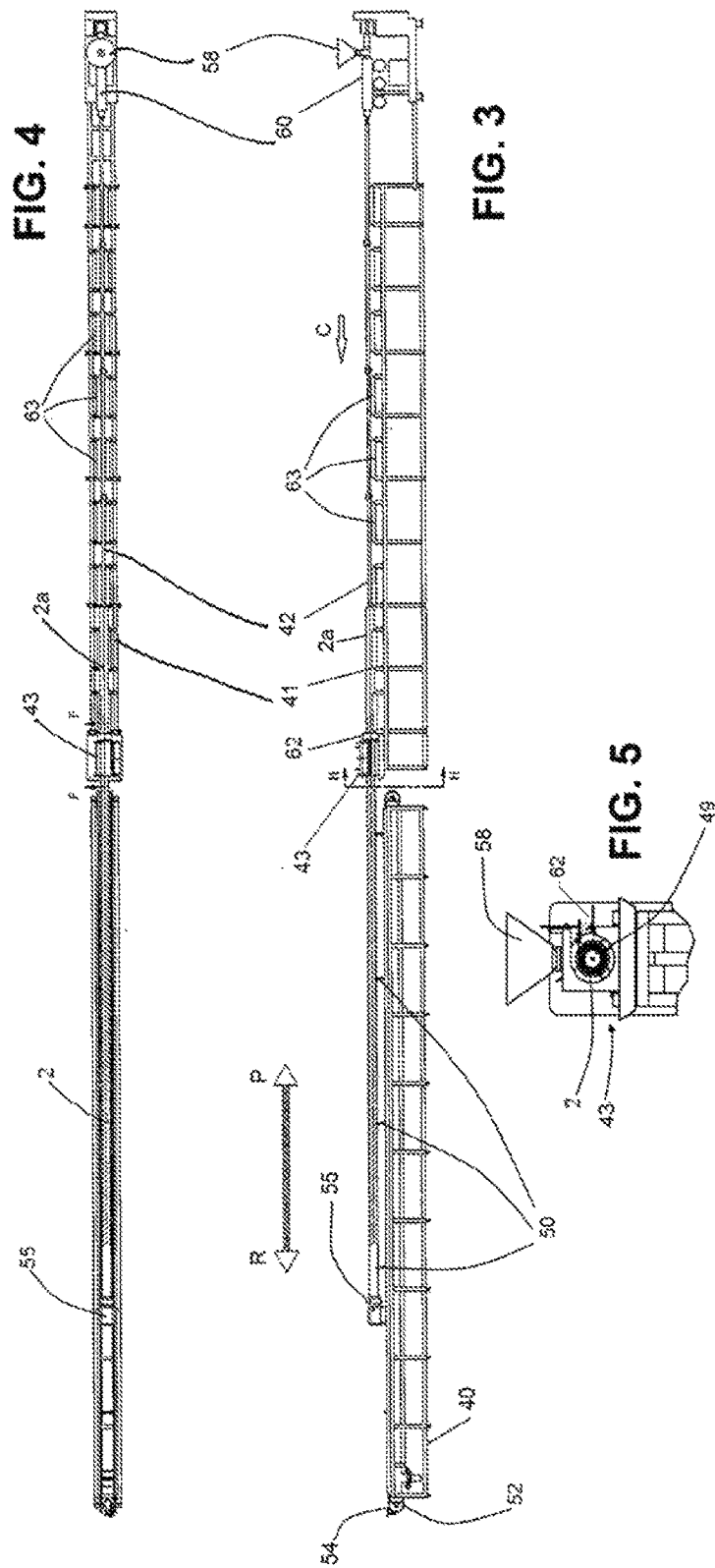

APPARATUS FOR TREATING A WELLBORE SCREEN AND METHOD

FIELD

The invention relates to an apparatus and methods for treating wellbore screens. In particular, the invention relates to an apparatus and methods for applying an internal coating to a wellbore screen.

BACKGROUND

Various wellbore tubulars are known and serve various purposes. A wellbore screen is a tubular including a screen material forming or mounted in the tubular's wall. The wellbore screen can be used in wellbores such as those for water, steam injection and/or petroleum product production.

In one form, a wellbore screen is known that includes a wall of screen material held between end fittings. The wall includes screen material that may take various forms and is usually supported in some way, as by a perforated sleeve. These screens filter fluids passing through the screen material layer either into or out of the screen inner diameter.

In another form, a wellbore screen is an apparatus that can include a base pipe and a plurality of filter cartridges supported in the base pipe. The filter cartridges are mounted in openings through the base pipe wall. The filter cartridges screen fluids passing through the openings into the base pipe for pumping or flow up hole. Of course, the openings may be formed and/or employed to also permit flow of fluids outwardly therethrough from the inner diameter of the base pipe.

SUMMARY

In accordance with one aspect of the present invention, there is provided an apparatus for treating a wellbore screen with a coating material, the apparatus comprising: a support for the wellbore screen, the support supporting an outer surface of the wellbore screen and presenting the wellbore screen with open access to its inner bore, as defined by an inner tubular wall of the wellbore screen; an elongate injector for injecting coating material into the inner bore of the wellbore screen, the elongate injector including a supported end, a distal end, and a coating material delivery line extending through the elongate injector from a coating material supply to a port at the distal end; and a driver for positioning the elongate injector into the inner bore and moving the elongate injector through the inner bore to introduce coating material to the inner bore such that the coating material can be distributed on to the inner tubular wall of the wellbore screen.

In accordance with another aspect of the present invention, there is provided a method for treating a wellbore screen, the method comprising: providing a wellbore screen including a tubular wall with an inner tubular surface defining an inner bore, an outer tubular surface and a screening component installed to screen fluid passing through the tubular wall from the outer tubular surface to the inner bore; inserting an elongate injector into the inner bore; introducing a coating material in the form of a liquid via the elongate injector into the inner bore; distributing the coating material onto the inner tubular surface such that the coating material penetrates to some extent into the screening component from the inner tubular surface; and allowing the coating material to set to form a removable seal across the screening component in the inner diameter.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Drawings are included for the purpose of illustrating certain aspects of the invention. Such drawings and the description thereof are intended to facilitate understanding and should not be considered limiting of the invention. Drawings are included, in which:

FIG. 1 is a side elevation of an apparatus in an initial position for applying a coating material to the inner diameter of a wellbore tubular;

FIG. 2 is a top, plan view of the apparatus of FIG. 1;

FIG. 3 is a side elevation of an apparatus in a mid process position for applying a coating material to the inner diameter of a wellbore tubular;

FIG. 4 is a top, plan view of the apparatus of FIG. 3;

FIG. 5 is a section along line H-H of FIGS. 1 and 3;

DETAILED DESCRIPTION OF VARIOUS EMBODIMENTS

Figure 8:
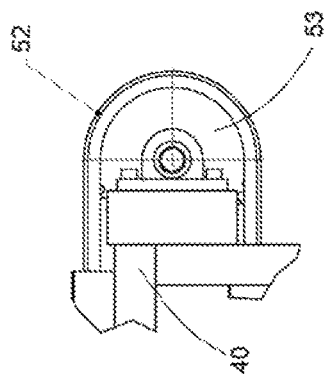
FIG. 8 is a magnified view of the area S of FIG. 1.
Figure 11:
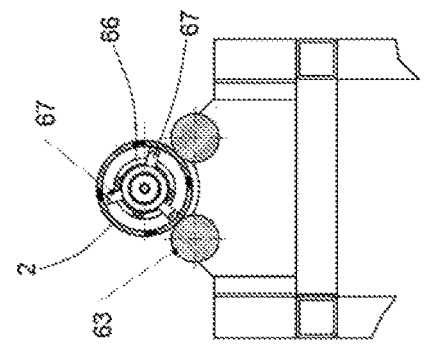
FIG. 11 is a section along line Y-Y of FIG. 1.
Figure 7:
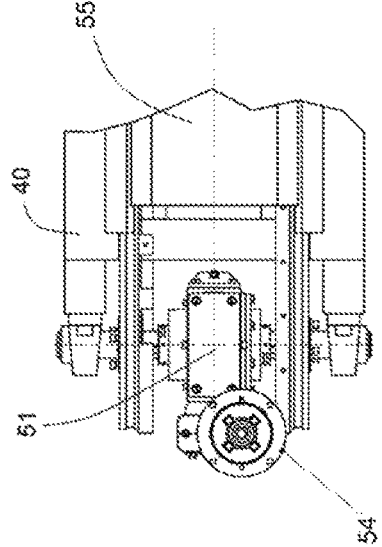
FIG. 7 is a magnified view of the area T of FIG. 2.
Figure 10:
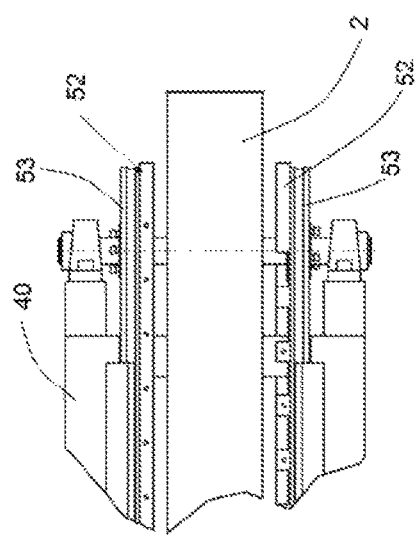
FIG. 10 is a magnified view of the area V of FIG. 2.
Figure 6:
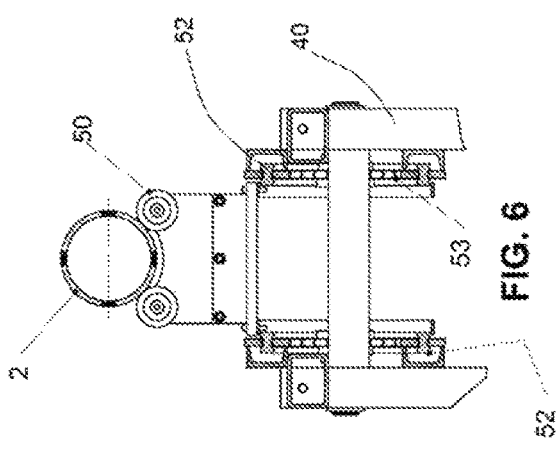
FIG. 6 is a section along line N-N of FIG. 1.
Figure 9:
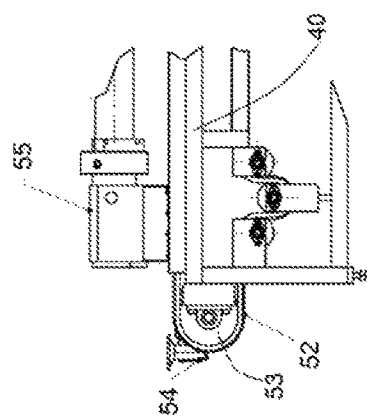
FIG. 9 is a magnified view of the area M of FIG. 1.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Referring to FIGS. 1 to 12b, an apparatus is shown and a method is described for applying a coating material to a wellbore screen. The apparatus and method can be employed to form a wellbore screen with an inner coating. In one embodiment, the wellbore screen 2 includes a tubular wall including an inner tubular surface defining an inner bore, an outer tubular surface and a screening component installed to screen fluid passing through the tubular wall from the outer tubular surface to the inner bore; and a coating on the inner tubular surface embedded into the screening component from the inner tubular surface, the coating substantially sealing against fluid passage through the screening component until the coating is at least partially removed.

The wellbore screen may be produced by a method comprising: providing a wellbore screen including a tubular wall with an inner tubular surface defining an inner bore, an outer tubular surface and a screening component installed to screen fluid passing through the tubular wall from the outer tubular surface to the inner bore; introducing a coating material in the form of a liquid into the inner bore; distributing the coating material onto the inner tubular surface such that it penetrates to some extent into the screening component; and allowing the coating material to set to form a removable seal across the screening component in the inner diameter. The word "liquid" as used herein includes liquid, semifluid and colloid. A semifluid is a substance with flow properties that are between those of solids and liquids.

The coating material is in the form of a liquid so that it can be distributed, such as for example by spreading or spraying, on the inner wall. In one embodiment, the viscosity of the liquid can be selected such that it tends not to rapidly migrate once introduced to the screen. For example, if the liquid has a low viscosity it may pour out of the tubular through the screening component as it is introduced. However, the viscosity of the liquid coating material can be selected such that the material introduced can be distributed onto the surface of the inner wall of the screen and can penetrate to some extent into the screening component, but is sufficiently viscous such that it remains in place once distributed. As will be appreciated, this ability to reliably place the coating material may also be achieved by selecting a liquid that rapidly moves through a phase change from liquid to solid when a temperature difference is encountered.

In this invention, the coating material may take various forms provided it can be handled in a liquid state and will set to a substantially solid form capable of creating a removable seal across the screening component. The coating material should have a repeatable phase change between solid and liquid such that it can be brought to a liquid state and will set to a solid state under predictable conditions of time and temperature. When in place and set in the wellbore screen, the coating material creates a substantial seal against fluid flow through the screening component, such that the screen acts as a tubular capable of holding pressures greater than would be otherwise possible if the coating material was not in place in the screening component. However, the coating material is removable to open the screening component to fluid flow therethrough. The coating material may be a polymer, a resin, a salt, a wax, or a combination thereof, etc. and may be removable by various means such as chemical breakdown, dissolution, solubilization, melting, etc. For example, the coating material may be a polymer removed by acid treatment, it may be a salt removed by solubilization in a liquid such as water, it may be wax removed by melting, etc.

In one embodiment, the coating material may be a wax such as paraffin wax. One useful wax has a repeatable phase change from solid to liquid between 50 to 90° C., such as a phase change from solid at 55° C. to 85° C. This wax also exhibits an extrudable and spreadable viscosity (i.e. of about 1000 to 1000000 centipoises) at a temperature of 65 to 75° C. When wax melts it is miscible in oil and wax can be removed from the surface of the wellbore screen, including the screening component, leaving substantially no residue. The crystalline structure, if any, of wax in the melted form is small enough to pass through a typical wellbore screening component without clogging, but forms a solid of substantial strength such that a pressure holding structure can be formed by infiltration of the wax into the screening component.

Depending on the coating material, the properties of the coating material may have to be adjusted to ensure the viscosity is appropriate. For example, the coating material may have to be heated before being introduced to the inner diameter or before being distributed. Alternately, or in addition, the method may include heating the wellbore screen before introducing the coating material to the inner diameter so that the coating material remains liquid once it contacts the material of the wellbore screen. The method may further include cooling and/or removing heat from the wellbore screen to facilitate the setting of the coating material.

Spreading or spraying the coating material onto the inner wall ensures that a substantially uniform coating is applied to the inner wall and the coating material penetrates into the screening material to some degree. The spreading procedure may also be configured to remove excess coating material from the inner diameter.

The method may include rotating the screen until the coating material is allowed to set. The screen may be rotated, for example, about its long axis to prevent the coating material from migrating by gravity to a low spot while it remains a liquid, until the coating material sets. Alternatively or additionally, the method may include rotationally spraying the coating material about the screen's long axis onto the inner wall.

The method can be carried out in various ways and by employing various apparatus. One possible apparatus is shown in FIGS. 1 to 12*b*.

The illustrated apparatus includes a support 40 for the wellbore screen 2, the support supporting an outer surface of the wellbore screen and presenting the wellbore screen with open access to its inner bore, as defined by the wellbore screen inner tubular wall 16; an elongate injector 42, also called a boom, for injecting coating material into the inner bore of the wellbore screen, the elongate injector being supported on a boom base 41 and including a supported end and a distal end; a coating material delivery line 56 extending through the elongate injector from a coating material supply 58 to the distal end; an injector head at or near the distal end 43; and a driver 54 for positioning the inner bore of the wellbore screen about the elongate injector and moving the elongate injector through the inner bore to distribute coating material onto the inner tubular wall of the wellbore screen. In particular, the driver 54 operates to drive the wellbore screen relative to the injector to position the elongate injector in the inner bore and move the elongate injector through the inner bore to introduce coating material from the injector to the inner bore.

In one embodiment, for example, the driver 54 is incorporated with the screen support 40 and together they form a driving base on which the screen is supported and along which the screen can be moved substantially in line with the screen's long axis. In this way, the screen can be moved along a drive axis in a forward direction (as illustrated by an arrow P) and in a reverse direction (as illustrated by an arrow R) while the inner bore remains substantially concentric with the drive axis.

In a further embodiment, the driver 54 includes a drive mechanism, such as a chain or belt drive. In the illustrated embodiment, the drive mechanism comprises a motor 51, a pair of chains 52, and two pairs of sprockets 53. One pair of sprockets 53 is positioned at or near one end of the screen support, while the other pair of sprockets is positioned at or near the other end of the screen support. Each sprocket is connected to the screen support near a lengthwise side of the screen support, and a face of the sprocket is substantially parallel to a face of the other sprocket in the pair. Each sprocket is connected to the driving in such a manner that allows the sprocket to rotate about its central axis, for example by extending an axle through an aperture on the lengthwise side of the screen support and through the central axis of the sprocket. Bearings may be disposed at the interface between the axle and the aperture, or between the axle and the sprocket, to allow the sprocket to rotate relative to the side of the screen support. In a further embodiment, the axle extends through both sprockets and both sides of the screen support at at least one end of the screen support. Of course, there may be other methods of rotatably connecting the sprockets to the screen support.

The motor 51 is configured to control the rotation of at least one pair of sprockets. In the illustrated embodiment, motor 51 is disposed near one pair of sprockets at one end of the screen support. A second motor may be disposed at the other end of the screen support, and each motor can operate independently and/or simultaneously, and each can be selectively utilized. Motor 51 may be directly connected to the axle(s) of the at least one pair of sprockets for rotating same. Motor 51 may be positioned in between the sprockets but not necessarily, as long as the motor is capable of controlling the rotation movement of the sprockets from wherever the motor is positioned. Motor 51 may be controlled locally or remotely. Motor 51 may also include a variable speed control and/or rotation direction control.

The distance between each pair of sprockets is preferably substantially the same as that of the other pair. Each of the chains 52 is meshed with one of the sprockets at each end of the screen support, such that the chains are substantially parallel to each other. The chains 52 preferably span across substantially the entire length of the screen support. The chains 52 are meshed with the sprockets 53, such that when at least one pair of sprockets is rotated, the chains 52 move relative to the screen support in line with the long axis of the screen support. In another embodiment, a belt may be used instead of chains 52. The belt has a width that is sufficient to span across and to mesh with each pair of sprockets at each end of the screen support. Alternatively, a single sprocket having a width substantially the same as that of the belt may replace the pair of sprockets at each end of the screen support.

The drive mechanism includes a fitting 55 is for engaging an end of the screen, for example, by threading to the threaded pin or box end of the screen. The use of threaded ends, as will be appreciated, is typical of a wellbore tubular such as a screen. In an alternative embodiment, the fitting includes a chuck, such as a scroll chuck, for engaging an end of the screen. The fitting 55 is connected to the drive mechanism in order to transfer the motion of the drive mechanism to the screen. In one embodiment, fitting 55 is connected to a section of the chains 52, so that when the chains move as a result of the rotation of the sprockets, fitting 55 moves with the chains. The drive mechanism is thereby capable of driving the engaged screen axially along the drive axis in both the forward direction P and reverse direction R, by switching the direction of the motor (if there is only one motor) or by alternating the operation of the motors (if there are two motors). The fitting may be attached to the chains in various ways, including for example by fasteners, adhesives, bonding, welding, etc. The fitting may be removably attached to the chains such that the fitting may be interchanged for accommodating screens of various sizes and/or for the purpose of repairs and maintenance.

The fitting 55 may also include a mechanism for rotating the screen about its long axis. For example, the fitting may engage the screen to drive it axially along the drive axis and have a pipe rotator component to drive the screen rotationally about the screen's long axis. In one embodiment, the rotator component is a motor; however, other similar mechanisms may be used as well. The rotator component may include a variable speed control and/or rotation direction control.

The drive mechanism also includes a plurality of rollers 50 on which the screen can be supported. The rollers may support any movement of the screen relative to the screen support, whether axially or rotationally. The rollers 50 are attached to chains 52 and may be positioned intermittently or continuously along chains 52. In the illustrated embodiment, the rollers are carried on roller supports which are attached to chains 52 at substantially equally spaced-apart intervals at long chains 52. The rollers and/or roller supports may be attached to the chains in various ways, including for example by fasteners, adhesives, bonding, welding, etc. In one embodiment, the rollers are metal wheels; however, other similar mechanisms and/or materials that can withstand heat (for example, up to approximately 250° C.) may also be used for the rollers.

In one embodiment, the rollers are attached to chains 52 in such a manner that when the fitting 55 is at or near one end of the screen support 40, the rollers are on an upper surface of chains 52 for supporting substantially the full length of the screen above the screen support. As the drive mechanism drives the screen in the forward direction P, the rollers also move with the chains and, one by one, as the rollers reach the other end of the screen support, they disengage from screen and move with the chains peripherally around the sprockets 53 to a lower surface. As such, the screen support 40 is configured to provide sufficient clearance for the rollers to move therethrough on the lower surface of the chains.

Even if the driver engages the wellbore screen at one end, the inner bore remains open at at least the other end of the screen and can be accessed at that other end of the screen.

The elongate injector handles the coating materials and operates to inject the coating material into the inner bore of the wellbore screen. In the illustrated embodiment, the driver drives the wellbore screen toward the distal end, with the inner bore in alignment with the long axis of the injector until the inner bore telescopes substantially concentrically over the distal end, for example as illustrated by a screen portion 2a in FIGS. 3 and 4. The injector may be selected to have a length from the supported end to the distal end, that is at least equal with the length of the portion of the screen to be coated. For example, in one embodiment, the screen may be over 100 feet long, with the screen component supported along almost that full length and the injector is at least that long.

The elongate injector can be supported on a support frame 41, also called a boom base. The distal end is the portion of the injector that can be inserted to access the full screen component supporting-length of the wellbore tubular. A coating material delivery line 56 (FIGS. 12a and 12b) therefore extends through the elongate injector from a coating material supply to a delivery port at the distal end. The delivery line 56 may be disposed inside an outer tubing 66. The outer surface of outer tubing 66 includes radially projecting boom supports 67 for supporting the boom on the support frame 41, or on the inner tubular wall of the screen while the elongate injector is inserted into the screen. The boom supports 67 may assist in aligning the central axis of the screen with that of the elongate injector.

In one embodiment, the coating material supply may be a tank, a hopper, etc. In the illustrated embodiment, the apparatus is selected to handle wax as a coating material and the coating material supply includes a hopper 58 for accepting a supply of solid wax and a wax extruder 60 including a heater to convert the wax to a substantially liquid form and an auger to force the liquified wax into the injector's delivery line. In the illustrated embodiment, the flow direction of the coating material in the delivery line is indicated by an arrow C.

In one embodiment, for example as illustrated in the Figures, the support frame 41 includes a plurality of rollers 63 on which the screen can be supported as the elongate injector is inserted into the screen. The rollers 63 may be supported by roller supports. The rollers and/or roller supports may be positioned intermittently or continuously along substantially the entire length of the support frame. The rollers 63 are configured to support both axial and rotational movements of the screen. The rollers and/or roller supports may be attached to the support frame 41 in various ways, including for example by fasteners, adhesives, bonding, welding, etc. In one embodiment, the rollers are metal wheels; however, other similar mechanisms and/or materials that can withstand heat (for example, up to approximately 250° C.) may also be used for the rollers.

While there is at least one port, there may be a plurality of ports at the distal end through which the coating material is extruded from the delivery line and introduced to the inner bore.

Figure 12A:
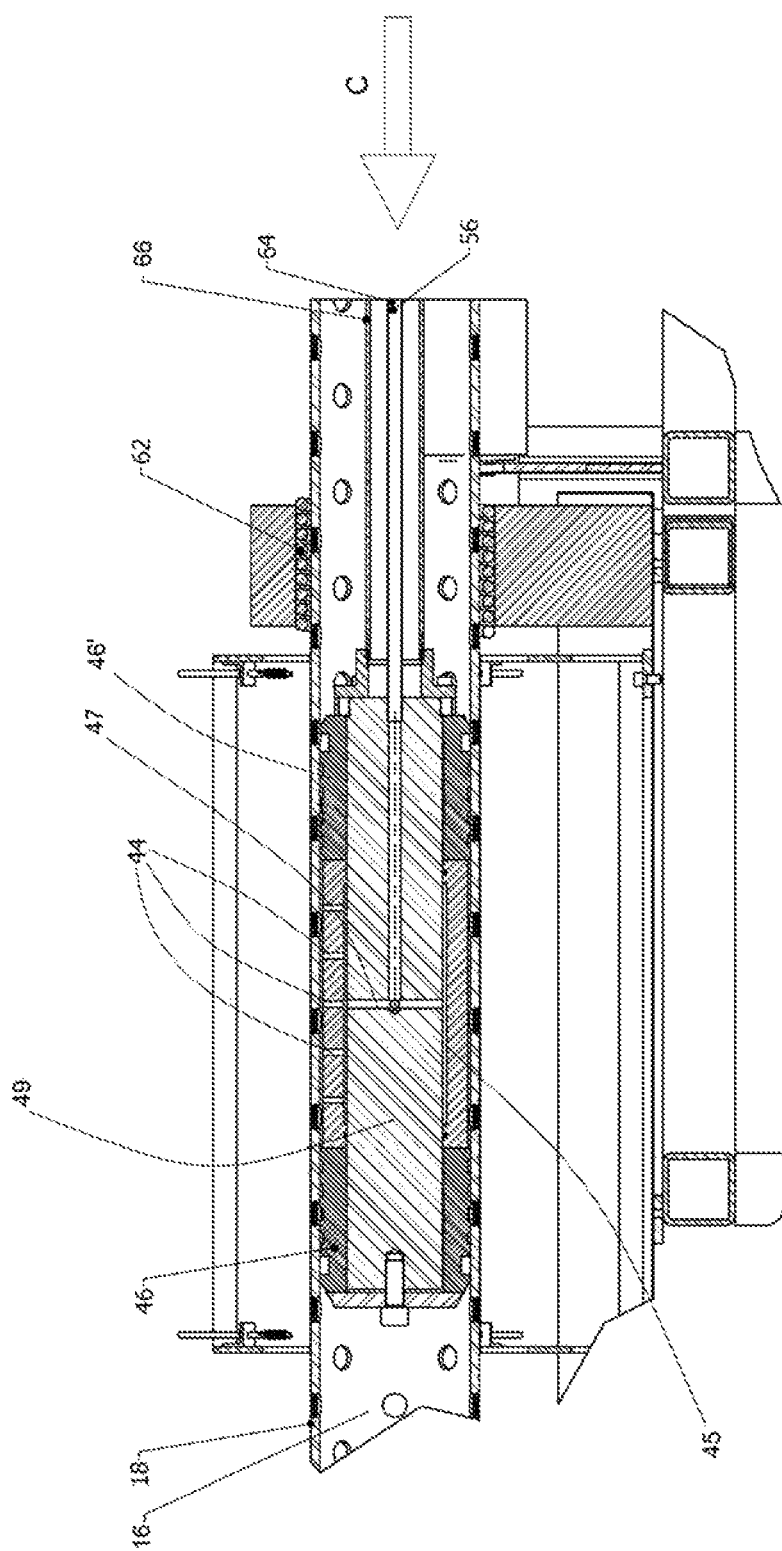
FIG. 12a is a section along line F-F of FIG. 4 showing one embodiment of the present invention.

In one embodiment, for example as illustrated in FIG. 12a, an injector head 49 carried on the distal end 43 includes at least one delivery port 44 for delivering coating material to the inner tubular of the wellbore screen and a spreader head 46 to spread the coating material introduced from the delivery port to the inner tubular wall of the wellbore screen. In one embodiment, the injector head includes a plurality of delivery ports arranged in a row. In a further embodiment, there are multiple rows of delivery ports around at least a portion of the circumference of the injector head, and the positions of the ports in adjacent rows may be staggered or aligned.

In the illustrated embodiment, the injector head further comprises supply ports 47, which are in communication with delivery line 56 to supply an annulus 45 with coating material. Ports 47 may be one or more separate outlet channels, or a disc-like outlet that is in fluid communication with annulus 45 at almost its entire circumference. Annulus 45 is in communication with delivery ports 44 to substantially evenly distribute coating material among the delivery ports, such that the flow rate of coating material out of each of the delivery ports 44 is substantially the same. In a further embodiment, annulus 45 is a space that extends around circumferentially inside the injector head such that the annulus is in simultaneous communication with multiple delivery ports 44 around the injector head. In a still further embodiment, annulus 45 is a slot formed inside the injector head for communicating with a selected row of ports 44.

The portion of the injector head 49 that carries the delivery ports 44 is sized and/or configured so that the ends of ports 44 from which coating material exits the injector head are positioned sufficiently close to the inner tubular wall, when the injector head is inserted into the screen, such that the coating material can easily be applied to the inner tubular wall without requiring the coating material to exit the delivery ports 44 at a high pressure. In one embodiment, the outlets of the delivery ports 44 are spaced from the inner tubular wall by a distance of approximately 1/16"±1/64". If wax is the coating material, the wax may be ejected from ports 44 at a pressure ranging between 1 to 2000 psi.

In the illustrated embodiment, the spreader head 46 carried by the injector head is generally cylindrical in shape and is made of flexible and/or resilient materials such as for example, a sheet of spring steel, rubber, etc. At least a portion of spreader head 46 has an outer diameter that is greater than the inner diameter of the screen, such that part of the outer surface of the spreader head urges against the inner tubular wall. In one embodiment, the spreader head includes a plurality of radially outwardly projections for engaging the inner tubular wall and such projections may form ridges and/or rings on the outer surface of the spreader head. The projections may assist in distributing the coating material on the inner tubular wall and/or in pushing the coating material into the screening component. In one embodiment, the spreader head has a groove formed on its outer surface for receiving a sealing ring. A sealing ring may be required if the coating material has low viscosity in order to help prevent the coating material from seeping out the end of the injector, thereby allowing the spreader head 46 to have contact with more coating material and to distribute same on to the inner tubular wall more efficiently.

The injector head may further include a resilient member (not shown) such as squeegee blade that rides over the inner wall surface to wipe off excess coating material and to drive the coating material into the screening component. In a further embodiment, the elongate injector includes a resilient member (not shown) that rides over the outer surface of the screen for wiping off excess coating material.

In the illustrated embodiment, spreader head 46 is disposed on one end of the injector head 49. Injector head 49 may include a second spreader head 46' at the other end. The second spreader head 46' may be configured to serve the same function as spreader head 46, as described above. In a further embodiment, spreader heads 46 and 46' are shaped such that injector head 49 tapers slightly at the ends, which may facilitate entry and withdrawal of the injector head into and out of the screen. If the second spreader head is omitted from injector head 49, the end of the injector head without a spreader head may be formed to taper slightly to facilitate entry or withdrawal of the injector head into or out of the screen. Whether one or both spreader heads should be included in the injector head depends on whether the coating material is injected during the insertion and/or withdrawal of the elongate injector into and/or out of the screen, which will be described in detail hereinbelow.

Figure 12B:
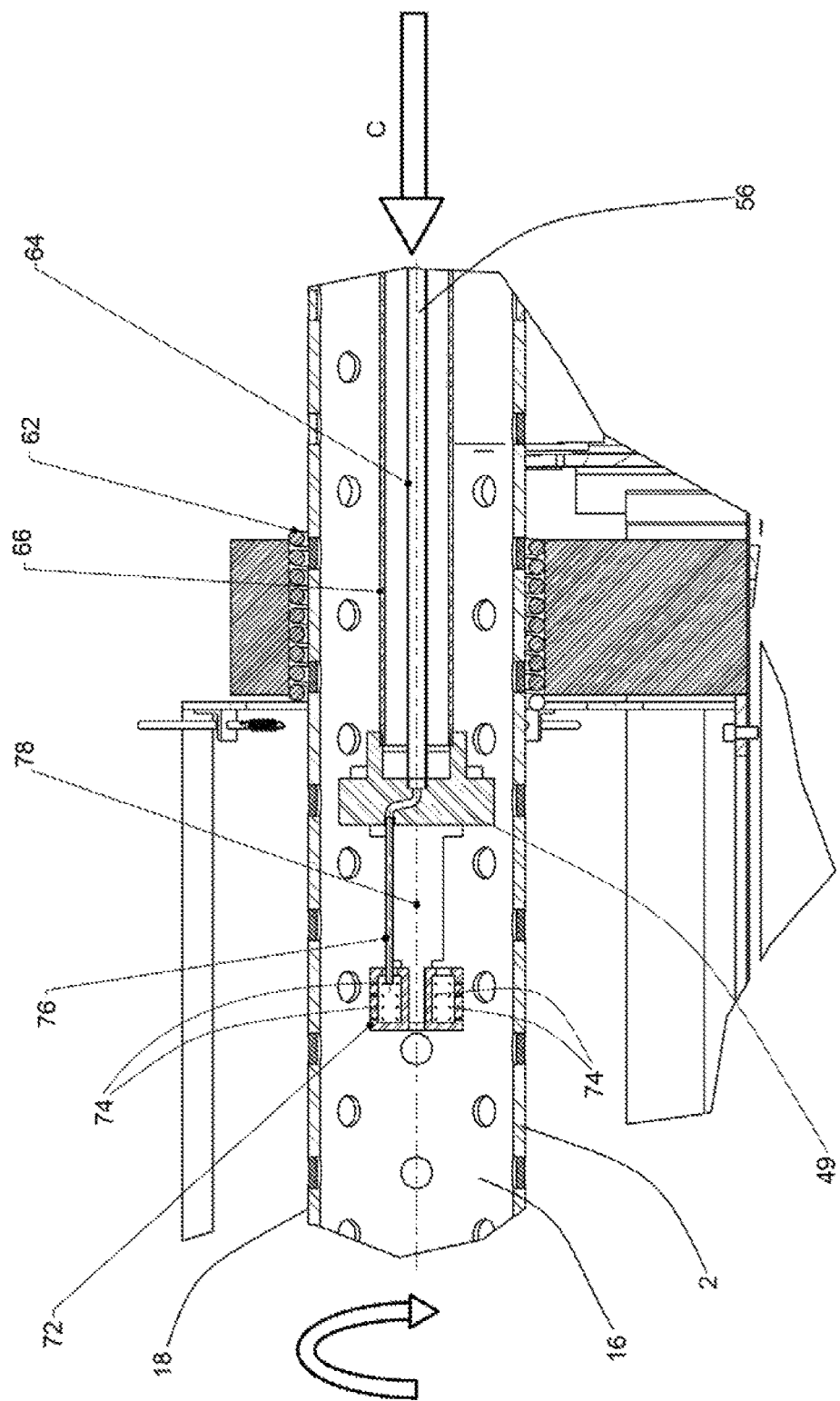
FIG. 12b is a section along line F-F of FIG. 4 showing another embodiment of the present invention.

In another embodiment, for example as illustrated in FIG. 12b, the injector head 49 includes a spray head 72 with a plurality of ports 74 for spraying coating material on to the inner tubular of the wellbore screen and a transfer tubing 76 for supplying the spray head with coating material from the delivery line 56. The ports 74 extend from the inner surface to the outer surface of the spray head and may be positioned circumferentially about the spray head such that the coating material may exit the spray head radially outwardly at various angles. In the further embodiment, the injector head includes a flexible and/or resilient member (not shown) that rides over the inner wall surface to spread coating material and/or wipe off excess coating material, and to drive the coating material into the screening component. Alternatively or additionally, a resilient member (not shown) is provided to ride over the outer surface of the screen for wiping off excess coating material.

In a further embodiment, the spray head is carried by a motor 78 for rotating the spray head about the injector's long axis. The spray head and the motor are sized so that they can move axially relative to the screen within the inner bore and the spray head can rotate within the inner bore without any interference with the inner tubular wall. The spray head may be rotated without or in addition to rotating the screen using pipe rotator component 55 as described above. The rotation of the spray head helps distribute the coating material on to the inner tubular wall of the screen.

In illustrated embodiments, the injector may include a heater (not shown) along the length of the delivery line to ensure the wax remains sufficiently liquid. The injector includes an inner tube 64 through which the wax moves and outer tubing 66 forming an annular space between the inner tube and the outer tubing. Heaters, for example induction heaters, may be installed in the annular space and may be operated to maintain the wax at a selected temperature in the inner tube sufficient to prevent the wax from hardening therein. In one embodiment, heaters line substantially the full length of delivery line 56.

In the illustrated embodiments, intended for use to inject wax, the apparatus includes a heating element for heating the screen before the wax is injected therein. For example, a substantially annular external heater 62 may be positioned substantially concentrically about the distal end of the injector with a space therebetween to accommodate the screen. In this configuration, as the injector is positioned in the inner bore, the external heater is adjacent and may surround the outer surface of the screen and can act to heat the screen from a position adjacent its outer surface. The heater 62 may be positioned adjacent either or both ends of the injector head 49 and may be selectively switched on or off. A section of the screen is preferably heated by heater 62 before wax is injected therein. Therefore, if the wax is to be distributed on to the inner tubular wall during the insertion of the injector into the screen, as described in more detail hereinbelow, then the heater 62 should be positioned adjacent to the end of the injector head that is further away from the supported end. If the wax is to be distributed on to the inner tubular wall during the withdrawal of the injector from the screen, as described in more detail hereinbelow, then the heater 62 should be positioned adjacent to the end of the injector head that is closer to the supported end, for example as illustrated in FIG. 12*a*. If the wax is to be distributed on to the inner tubular wall during both the insertion and withdrawal of the injector, then preferably a heater 62 is positioned adjacent each end of the injector head and is selectively turned on or off depending on the direction of movement of the injector relative to the screen, such that the screen is heated before the injection of wax therein.

If the injector includes a heater, as noted above as an option, the screen can be heated from the inside and from the outside. By heating the screen, the surface can be prepared such that the wax does not immediately harden when it is injected thereon. The wax can therefore remain substantially liquid such that it can be spread and form a substantially continuous seal infiltrated to some degree into the screening component. For example, the external heater may be an induction heater, a resistance heater, or a combination thereof. The external heater can be controlled by thermocouples.

It can be appreciated that at least some of the parts of the apparatus can be removably attached, such that they may be replaced and/or removed for the purpose of maintenance and repairs.

The components of the apparatus, such as supports 40, 41, fitting 55, chains 52, sprockets 53, inner tube 64, and outer tubing 66, are preferably made of materials that have sufficient structural integrity to support various loads and that can withstand high temperatures (for example, up to approximately 250° C.). In one embodiment, supports 40 and 41 are made of steel; fitting 55, chains 52, sprockets 53, and inner tube 64 are made of stainless steel; and outer tubing 66 is made of aluminum. Other materials that have similar physical properties as those mentioned above may also be used in the apparatus.

In operation of the apparatus, a screen 2 can be installed on the driving base, supported by the rollers 50 and with the fitting secured to the screen such that the screen can be moved by the drive mechanism. The coating material can then be prepped for injection. Using wax, the coating material can be supplied as a solid and melted and prepared for injection to the screen. In the illustrated apparatus, the wax is melted on an as needed basis from the hopper through the wax extruder. The heaters in the elongate injector and the external heaters are operated to generate heat. The heaters along the delivery line are operated as necessary to maintain the liquid state of the coating material in the delivery line.

The driver is then operated to move the screen to engulf the injector in the inner bore. As this is done, the screen itself is heated, as it moves in the forward direction P past the external heater 62 and as the injector is advanced within.

With respect to the illustrated embodiment shown in FIG. 12*a*, once the delivery ports 44 are inserted to a depth past the screening components to be coated, the coating material is introduced from the delivery ports and is spread over the inner wall. Simultaneously, the screen is moved in the reverse direction R by the drive mechanism such that the injector is withdrawn from the inner bore as the coating material is applied and spread along a length of the screen. Excess coating material may be scraped from the inner wall and/or outer surface of the screen.

While the coating can be applied as the injector is run into the inner bore, this may not be entirely desirable if there is a risk of the movement of the injector damaging the coating as it is withdrawn out past the applied coating.

If desired, the driver can also be operated to rotate the screen about its long axis as the coating material is applied. This rotation may reduce pooling and loss of coating material by gravity.

With respect to the illustrated embodiment shown in FIG. 12*b*, once the spray head 72 is inserted to a depth where the screening components to be coated begin, the coating material is introduced from the ports 74 and is sprayed over the inner wall. Simultaneously, the screen is moved in the forward direction P by the driver such that the injector continues to advance within the inner bore as the coating material is sprayed along a length of the screen. In addition to spraying, the coating material may be further distributed on to the inner tubular wall by a spreader. Alternatively or additionally, excess coating material may be scraped from the inner wall and/or outer surface of the screen. Once a desired length of the inner tubular wall has been coated with coating material, the screen is moved in the reverse direction R by the driver such that the injector is withdrawn from the inner bore. In a further embodiment, the spray head sprays additional coating material over the previously coated section of the screen during the withdrawal of the injector. Alternatively, the inner bore is only sprayed with coating material during the withdrawal of the injector.

In a still further embodiment, the spray head is rotated about the injector's long axis by the motor 78 while spraying coating material on to the inner tubular wall. If desired, the driver can also be operated to rotate the screen about its long axis as the coating material is applied. Alternatively, the coating material may be sprayed on to the inner bore of a rotating screen without any rotational movement of the spray head.

The conditions of the coating materials and receiving surface of the screen and speed of screen movement are selected to ensure proper placement and set up of the coating material. For example, using wax, the temperatures of the wax and screen are selected to avoid the wax from dripping directly out of the screen and to avoid the wax from immediately setting up (before it can be spread and/or driven into the screening components) and the speed of pulling the screen off the injector is selected with consideration of the foregoing.

Wellbore screens can take many forms. As noted above, in one form of a wellbore screen the wall of the screen is substantially entirely formed of screening component. The wall includes screen material held between end fittings. The screen material may take various forms and is usually supported in some way, as by a perforated sleeve. These screens filter fluids passing through the screen material layer either into or out of the screen inner bore.

In another form, the one termed the cartridge-type screen, the wall of the screen is a base pipe that has a plurality of discreet filter cartridges supported therein. The filter cartridges are mounted in openings through the base pipe that forms the wall. The filter cartridges screen fluids passing through the openings into the base pipe for pumping or flow up hole. Of course, the openings may be formed and/or employed to also permit flow of fluids outwardly therethrough from the inner diameter of the base pipe.

Figure 13:
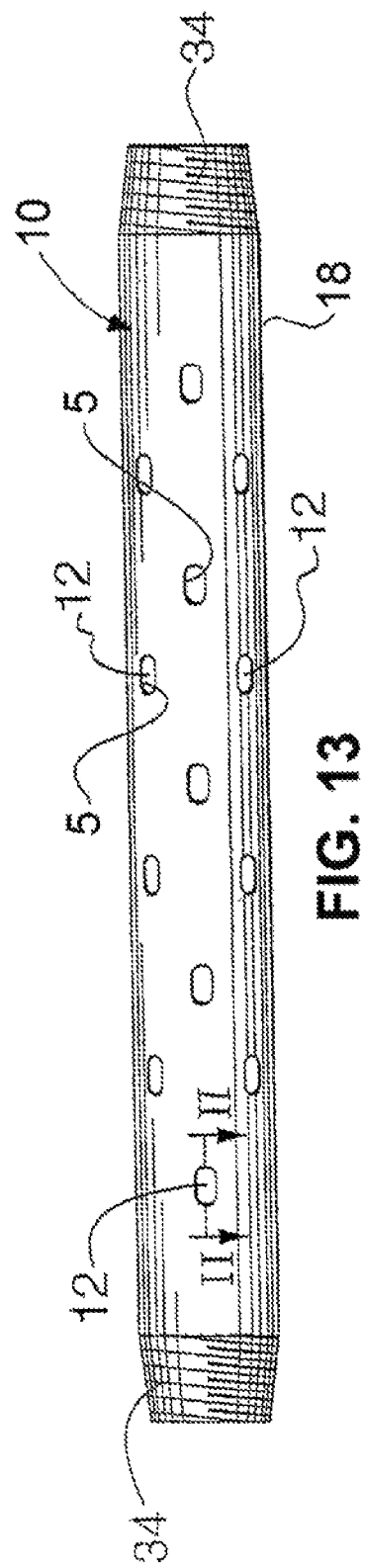
FIG. 13 is a side elevation of one wellbore tubular useful in the present invention.
Figure 14:
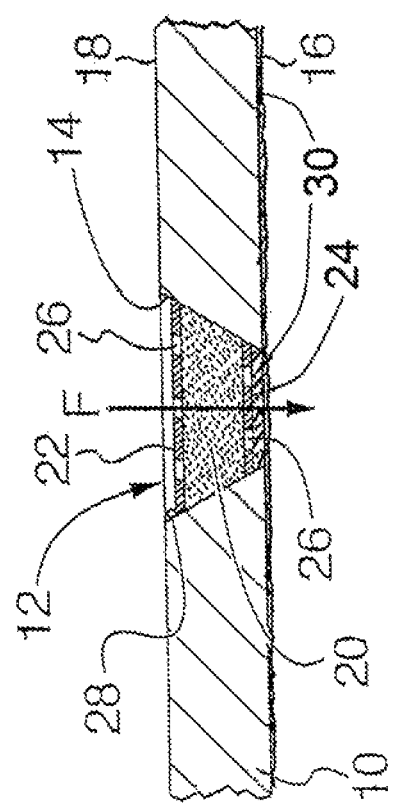
FIG. 14 is a section along line II-II of FIG. 13.

While the wellbore screen treated in the present invention can take many forms, one type of wellbore screen is disclosed here for clarity. Referring to FIGS. 13 and 14, a wellbore screen is shown including a perforated wall with fluid passages therethrough, which is illustrative of a cartridge-type screen. A cartridge-type screen includes a base pipe 10 including substantially circular such as circular or ovoid openings 5 that extend from the base pipe inner bore surface 16 to the base pipe outer surface 18 and a filter cartridge 12 is supported in each opening. Such a screen is durable and is useful in various wellbores operations such as those for water production, water/steam injection, oil and/or gas production, etc. The filter cartridges permit fluid flow through the openings into or out of the base pipe, but the integrity of the base pipe provides the screen with increased durability and strength not achievable in screens with walls entirely formed of screening components.

The filter cartridge 12 useful in a wellbore screen can include a filter media 20. In one embodiment, the filter cartridge can also include one or more retainer plates positioned about the filter media. In one embodiment, as illustrated, the filter cartridge includes an exterior retainer plate 22, an interior retainer plate 24 and filter media 20 contained therebetween. In one embodiment, the exterior retainer plate and the interior retainer plate may be coupled to one another by any of a plurality of methods, such as adhesives, welding, screws, bolts, plastic deformation and so on. In another embodiment, the retainer plates are not secured together but held in position by their mounting in the base pipe.

If used, the exterior retainer plate and the interior retainer plate may contain one or more apertures 26 through which fluid may flow, arrow F. Exterior retainer plate 22 and interior retainer plate 24 may be constructed of any suitable material, such as plastic, aluminum, steel, ceramic, and so on, with consideration as to the conditions in which they must operate.

Filter media 20 of the filter cartridge can be any media, such as including a layer of compressed fiber, woven media, ceramic and/or sinter disk that is capable of operating in wellbore conditions. The filter media must be permeable to selected fluids such as one or more of steam, stimulation fluids, oil and/or gas, while able to exclude oversized solid matter, such as sediments, sand or rock particles. Of course, certain solids may be permitted to pass, as they do not present a difficulty to the wellbore operation. Filter media can be selected to exclude particles greater than a selected size, as desired. The present screen can employ one or more layers or types of filter media. In one embodiment, a filter media including an inner woven screen, an outer woven screen and a fibrous material is used. In another embodiment, a filter cartridge may include a single layer of filter media, as shown in FIG. 14, to facilitate manufacture. Sintered material may be useful as a single layer filter media.

Openings 5 may be spaced apart on the base pipe wall such that there are chambers of solid wall therebetween. The openings extend through the base pipe sidewall and may each be capable of accommodating a filter cartridge 12. The filter cartridges can be mounted in the openings by various methods including welding, threading, etc. In one embodiment, at least some filter cartridges may be installed by taper lock fit into the openings. In such an embodiment, each of the filter cartridge and the opening into which it is to be installed may be substantially oppositely tapered along their depth so that a taper lock fit can be achieved. For example, the effective diameter of the opening adjacent the base pipe's outer surface 18 may be greater than the effective diameter of the opening adjacent inner bore surface 16 and cartridge 12 inner end effective diameter, as would be measured across plate 24 in the illustrated embodiment, may be less than the effective diameter at the outer end of filter cartridge 12 and greater than the opening effective diameter adjacent inner bore surface 16, so that the filter cartridge may be urged into a taper lock arrangement in the opening. In particular, the outer diameter of the filter cartridge can be tapered to form a frustoconical (as shown), frustopyramidal, etc. shape and this can be fit into the opening, which is reversibly and substantially correspondingly shaped to engage the filter cartridge when it is fit therein. In one embodiment for example, the exterior retainer plate may exceed the diameter of the interior retainer plate of the filter cartridge. Of course, the filter cartridge may be tapered from its inner surface to its outer surface in a configuration that is frustoconical, frustopyramidal, and so on and the openings of the base pipe may be tapered correspondingly so that their diameter adjacent the inner bore surface is greater than that adjacent the side wall outer surface, if desired. However, installation may be facilitated by use of an inwardly directed taper, as this permits the filter cartridges to be installed from the base pipe outer surface and forced inwardly.

The filter cartridges may be secured in the base pipe openings by any of various means. For example, in one embodiment, the filter cartridge may be press-fit into the opening of the base pipe. In another embodiment, the filter cartridge may be secured to the opening of the base pipe by an adhesive 28 (for example epoxy), by welding, by soldering, by plastic deformation of the base pipe over the cartridge, by holding or forcing the cartridge into engagement behind a retainer or extension over of the opening and so on, at one or more of the interface points between the filter cartridge and the base pipe. A seal, such as an o-ring, may be provided between the filter cartridge and the opening, if desired.

In a wellbore screen, as shown, the coating applied by the apparatus and method may form a selectively openable impermeable layer 30 relative to at least some of the plurality of openings. The impermeable layer can be normally closed and when closed is impermeable to solid matter as well as substantially impermeable to fluid flow, such as any or all of wellbore fluids, drilling fluids, injection fluids, etc. Impermeable layer 30, however, can be selectively opened at a selected time, such as when the screen is in a selected position downhole, such as when it is in a finally installed position.

The impermeable layer may act at one or a plurality of openings to plug fluid flow therethrough. As described above, the impermeable layer will be positioned to infiltrate into filter media 20 from the inner diameter side. The impermeable layer may serve to cover/block/plug the openings and the filter cartridge in order to prevent the flow of fluid therethrough and/or to prevent access of solids to the filter media, until the impermeable layers are selectively opened.

The impermeable layer may be opened to permit fluid flow once the wellbore screen is in position down hole. The method of opening can vary based on the material of the impermeable layer, and may include pressure bursting and/or removal by solubilization, melting, etc. as by acid, caustic or solvent circulation, temperature sensitive degradation, and so on.

In one application, a wellbore screen including impermeable layers relative to its openings, may be useful to increase buoyancy of the screen during installation, which is useful in horizontal installations. The impermeable layer also resists plugging of the openings, which can result for example from the rigors of running in. In another application, the impermeable layers are used to selectively allow flow along or from a certain section of the wellbore, while flow is blocked through other openings. In yet another application, a wellbore screen including impermeable layers relative to its openings, may be useful to allow fluid circulation through the screen during run in, which reduces hole stuck and cave in problems. Removable layers in the screening components also permit drilling of the screen into the hole, as by liner drilling. In such an application, the impermeable layers can be selected to hold the pressures encountered during drilling, for example, pressures of a few hundred psi. In such an embodiment, the impermeable layers will be present to plug the openings at least when the wellbore screen is being run down hole so that the wellbore screen may be drilled directly into the hole. Once the screen is drilled into position, the impermeable layers may be opened, as by residence time at wellbore conditions, circulating fluids to breakdown and remove the coating material (i.e. circulating heated fluids to melt the coating material) or bursting with application of fluid pressure above that which the layers can hold.

Depending on the application, it may be useful to seal all of the openings of a wellbore screen or it may be useful to block only certain of the openings, while others are left open. In another embodiment, it may be useful to use selected materials to form the impermeable layers on a first group of openings while another impermeable layer material is used over the openings of a second group so that some openings within a liner, for example those of the first group, can be opened while others, for example the openings of the second group, remain closed until it is desired to remove or break open that impermeable material.

One or more impermeable layers can be used, as desired. The layers may be positioned to provide protection to certain filter cartridge components.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. For US patent properties, it is noted that no claim element is to be construed under the provisions of 35 USC 112, sixth paragraph, unless the element is expressly recited using the phrase "means for" or "step for".

I claim:

1. A method for treating a wellbore screen, the method comprising: inserting an elongate injector into an inner bore of a wellbore screen including a tubular wall with an inner tubular surface defining the inner bore, an outer tubular surface and a screening component installed to screen fluid passing through the tubular wall from the outer tubular surface to the inner bore; heating a coating material to convert it from a solid to a liquid; introducing the coating material in the form of the liquid via the elongate injector; reheating the coating material while it is in the elongate injector before it is applied onto the inner bore inner tubular surface; distributing the coating material onto the inner tubular surface by pushing a ring-shaped spreader head through the inner bore and against the inner tubular surface such that the coating material penetrates to some extent into the screening component from the inner tubular surface; and allowing the coating material to set to form a removable seal across the screening component in the inner diameter.

2. The method of claim 1, wherein the elongate injector comprises a supported end, a distal end, and a coating material delivery line extending through the elongate injector from a coating material supply to a port at the distal end, and the coating material is distributed through the port on to the inner tubular surface.

3. The method of claim 2, wherein the port is formed in an injector head and the injector head is selectively rotatable about a long axis of the elongate injector.

4. The method of claim 3, further comprising rotating the injector head during the introduction of the coating material.

5. The method of claim 2 further comprising heating a portion of the wellbore screen.

6. The method of claim 1, wherein inserting of the elongate injector is performed by a drive mechanism.

7. The method of claim 6, wherein the drive mechanism engages an end of the wellbore screen and positions the inner bore of the wellbore screen about the elongate injector.

8. The method of claim 1 further comprising scraping excess coating material from a surface of the wellbore screen.

9. The method of claim 1 further comprising withdrawing the elongate injector from the wellbore screen.

10. The method of claim 9, wherein the coating material is introduced during the withdrawal of the elongate injector.

11. The method of claim 1 further comprising rotating the wellbore screen during the introduction of the coating material.

12. The method of claim 1, wherein distributing includes spraying the coating material.

13. The method of claim 1, wherein the coating material is introduced during the insertion of the elongate injector.

* * * * *